United States Patent [19]
Scherenberg

[11] 3,844,580
[45] Oct. 29, 1974

[54] PROTECTION INSTALLATION FOR THE PASSENGERS OF VEHICLES ESPECIALLY MOTOR VEHICLES

[75] Inventor: Hans O. Scherenberg, Stuttgart, Germany

[73] Assignee: Daimler-Benz Aktiengesellschaft, Stuttgart, Germany

[22] Filed: Feb. 17, 1972

[21] Appl. No.: 227,039

[30] Foreign Application Priority Data
Feb. 18, 1971 Germany............... 2107780

[52] U.S. Cl. ............. 280/150 AB, 2/6, 128/152, 181/23, 180/103, 137/48, 137/51, 137/81
[51] Int. Cl. ........................................... B60r 21/08
[58] Field of Search....... 280/150 AB; 128/152; 2/6; 181/23

[56] References Cited
UNITED STATES PATENTS

| | | | |
|---|---|---|---|
| 2,619,960 | 12/1952 | Reynolds ........................... | 128/152 |
| 3,335,720 | 8/1967 | Aileo ................................. | 128/152 |
| 3,527,472 | 9/1970 | Chute ........................... | 280/150 AB |
| 3,603,309 | 9/1971 | Wesemann........................ | 128/152 |
| 3,661,225 | 5/1972 | Anderson....................... | 128/152 X |
| 3,694,003 | 9/1972 | Radke ........................... | 280/150 AB |

Primary Examiner—David Schonberg
Assistant Examiner—John P. Silverstrim
Attorney, Agent, or Firm—Craig & Antonelli

[57] ABSTRACT

A protective device for the passengers of vehicles, especially of motor vehicles which are equipped with gas cushions adapted to be automatically inflated in case of an accident; the hearing passages in the ears of the passengers are thereby partially or completely closed off by these protective devices when the vehicle is so strongly decelerated that the actuating mechanism for the gas cushions is triggered off and/or when the pressure increase occurring as a result of the inflation of the gas cushions in the vehicle interior exceeds a predetermined value.

9 Claims, 2 Drawing Figures

PATENTED OCT 29 1974            3,844,580

PROTECTION INSTALLATION FOR THE PASSENGERS OF VEHICLES ESPECIALLY MOTOR VEHICLES

The present invention relates to a protection installation for the passengers of vehicles, especially of motor vehicles, which are equipped with gas cushions automatically inflatable in case of an accident.

Tests with such types of gas cushions have demonstrated that a considerable protection of the vehicle passengers is attainable also in case of accidents which occur at relatively high velocities.

However, these tests have also indicated at the same time that as a result of the detonation or bang during the sudden inflation of such gas cushions and as a result of the occurring pressure increase in the vehicle interior space, permanent hearing damages, especially with older vehicle passengers, cannot be excluded.

The present invention is therefore concerned with the task to provide an effective remedy for these drawbacks.

Accordingly, a protective device for passengers of vehicles, especially of motor vehicles, which are equipped with gas cushions automatically inflatable in case of an accident, is proposed whereby according to the present invention protective devices are provided for the passengers which close off either completely or partially the hearing passages or channels of the passengers when the vehicle is so strongly decelerated that the actuating mechanism for the gas cushions is triggered off and/or when the pressure increase occuring in the vehicle due to the inflation of the gas cushion exceeds a predetermined value.

In one protective installation in vehicles in which the trigger pulse for the inflation of the gas cushions takes place by way of an electric circuit closed by a switch responsive to the vehicle deceleration which brings about, for example, the ignition of an explosive charge arranged in a gas tank or container, it is particularly advantageous if the protective device is actuated by the closing of the electric circuit prior to the transmission of the triggering pulse for the gas cushions.

The realization of the inventive concept can take place, for example, in that an electrical delay element such as, for example, an RC element is arranged in the line leading to the explosive charge.

It is achieved thereby that the triggering pulse for the explosive charge arrives somewhat later than the pulse effecting the actuation of the protective device.

Possibly simple ear plugs for the vehicle passengers may be provided which close, for example, by means of conventional ball valves the hearing passages of the vehicle passengers when the pressure in the vehicle interior space exceeds a predetermined value.

Accordingly, it is an object of the present invention to provide a protective installation for the passengers of vehicles, especially motor vehicles which avoids by simple means the aforementioned shortcomings and drawbacks encountered in the prior art.

Another object of the present invention resides in a protective device for the passengers of motor vehicles which precludes permanent injuries to the hearing of the passengers due to the explosive noise and/or the pressure increase in the vehicle's interior space as a result of the automatic inflation of the gas cushions in case of an accident.

A further object of the present invention resides in a protective device of the type described above which is simple, utilizes relatively few and inexpensive parts and is extraordinarily reliable in operation.

These and further objects, features and advantages of the present invention will become more apparent from the following description when taken in connection with the accompanying drawing figures which show, for purposes of illustration only, one embodiment in accordance with the present invention, and wherein.

Figure 1:
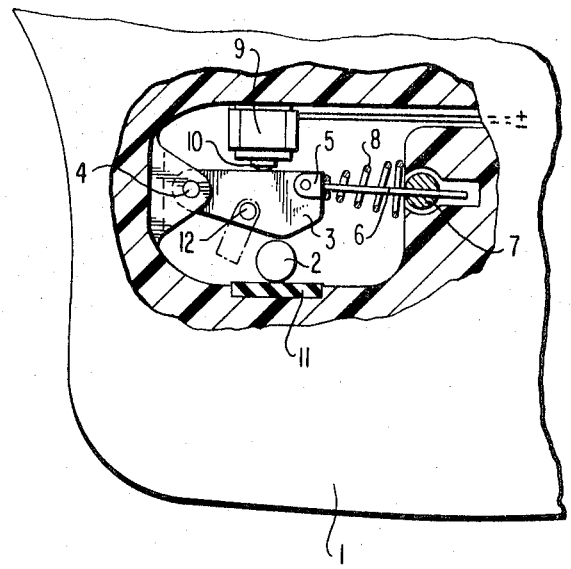
FIG. 1 is a partial elevational view, partly broken away, of an embodiment of a protective device provided, for example, in a protective helmet to be worn by the passengers.

Referring now to FIG. 1, a protective device according to the present invention is arranged in an otherwise conventional protective helmet 1 illustrated partly in cross-section in this figure. A through-passage 2 which is normally not closed is provided in the protective helmet 1 which connects the hearing passage in the ear of the vehicle passenger with the surroundings. This opening 2 can be closed by a flap-like valve member 3 which is pivotally secured at the helmet 1 about a bolt 4. A rod 6 is pivotally connected at the opposite free end of the valve member 3 by way of a fork 5; the other end of the rod 6 is displaceably guided in a ball 7 supported in the protective helmet 1. The valve 3 is pressed against an electromagnet 9 by a compression spring 8 which, on the one hand, is supported at the protective helmet 1 in proximity of the ball 7 and on the other, at the fork 5, because the effective line of action of the compression spring 8 extends above the connecting line between the pivot axis of the valve member 3 and the center of the ball 7. Upon closing of the energizing circuit, as shown in FIG. 2, which brings about the actuation of the gas cushions, the electromagnet 9 is energized and the valve member 3 is pressed downwardly against a damping element 11 by way of a plunger 10 from its initial position beyond a dead center point for closing the throughpassage 2 whereby this movement is considerably accelerated by the compression spring 8.

An actuating handle 12 or the like is arranged at the valve member 3 by means of which the valve member 3 can be pivoted back into the illustrated original position from the closing position thereof.

Figure 2:
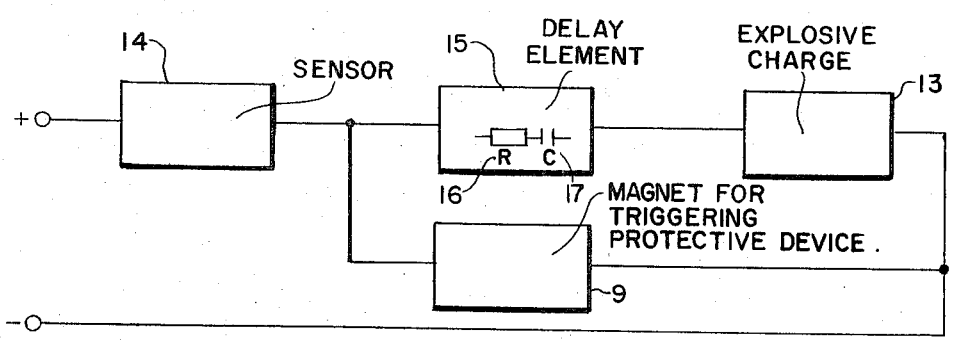
FIG. 2 is a schematic block diagram for use in the present invention.

The energization circuit of FIG. 2 is of a conventional type for triggering the inflation of gas cushions in which an explosive charge 13 is triggered by means of a sensor 14, detecting sudden decelerations of the vehicle. A delay element 15, including an RC element 16, 17, is provided in the line leading to the explosive charge 13 to achieve the realization of the present invention. That is, the triggering pulse for the explosive charge 13 arrives somewhat later than the pulse effecting the actuation of the electromagnet 9 of the protective device of this invention.

Of course, energization of the electromagnet 9 may also be effected by a circuit including a pressure responsive switch. Moreover, in its most simple form, the desired protection for the passengers may be obtained by conventional ear plugs which comprise each a normally open check valve adapted to close upon the occurrence of a predetermined pressure increase. Since such check valves are known as such in the art, a detailed description thereof is dispensed with herein.

While I have shown and described only one embodiment in accordance with the present invention, it is understood that the same is not limited thereto but is susceptible of numerous changes and modifications as known to those skilled in the art. For example, the protective helmet 1 may be of any suitable known construction and made from any suitable material. The triggering pulses can be produced by any known means, for example, responsive to sudden decelerations of the vehicle. Consequently, I do not wish to be limited to the details shown and described herein but intend to cover all such changes and modifications as are emcompassed by the scope of the appended claims.

What I claim is:

1. A protective device for the passengers of vehicles, especially motor vehicles, which are equipped with gas cushion means automatically inflatable in case of an accident, characterized in that the protective device provided for a vehicle passenger comprises valve means for at least partially closing the hearing passage in the ear of the passenger and including further means for actuating said valve means in response to a control magnitude reflecting at least one of predetermined deceleration of the vehicle and predetermined pressure increase occurring in the vehicle as a result of the inflation of the gas cushion means, said valve means being actuated to at least partially close said hearing passage, and in which the triggering pulse for the inflation of the gas cushion means take place by way of an electric energizing circuit closed by a switch means responding to a predetermined vehicle deceleration, characterized in that the protective device is actuated by the closing of the energizing circuit prior to the application of the triggering pulse to an actuating mechanism for causing inflation of the gas cushion means.

2. A protective device according to claim 1 characterized in that said further means is operable in response to a predetermined deceleration of the vehicle and in response to a predetermined pressure increase inside the vehicle.

3. A protective device according to claim 1 characterized in that the triggering pulse is operable to bring about the ignition of an explosive charge forming part of the actuating mechanism.

4. A protective installation according to claim 3, characterized in that a delay means is arranged in a line for the triggering pulse leading to the explosive charge.

5. A protective device according to claim 4, characterized in that said delay means is an RC circuit element.

6. A protective device according to claim 5, characterized in that said protective device is incorporated in a protective helmet having an open connecting passage for connecting the hearing channel of a passenger ear with the outside and operable to be closed by said valve means.

7. A protective device according to claim 6, characterized in that the helmet includes two connecting passages, one for each ear, and two valve means, one for each connecting passage.

8. A protective device according to claim 1, characterized in that said protective device is incorporated in a protective helmet having an open connecting passage for connecting the hearing channel of a passenger ear with the outside and operable to be closed by said valve means.

9. A protective device according to claim 8, characterized in that the helmet includes two connecting passages, one for each ear, and two valve means, one for each connecting passage.

* * * * *